United States Patent
Tsujisawa et al.

(10) Patent No.: US 6,826,351 B1
(45) Date of Patent: Nov. 30, 2004

(54) PERSONAL COMMERCIAL BANK SYSTEM

(75) Inventors: Takahiko Tsujisawa, Tokyo (JP); Hideaki Ajima, Osaka (JP)

(73) Assignee: NEC Corporation, Tokyo (JP)

( * ) Notice: Subject to any disclaimer, the term of this patent is extended or adjusted under 35 U.S.C. 154(b) by 871 days.

(21) Appl. No.: 09/686,084

(22) Filed: Oct. 12, 2000

(30) Foreign Application Priority Data

Oct. 13, 1999 (JP) ............................................ 11/290830

(51) Int. Cl.⁷ .......................... H04N 5/91; H04N 5/445
(52) U.S. Cl. ......................................... 386/83; 725/42
(58) Field of Search .............................. 386/83, 46–52, 386/95; 725/32, 34, 36, 27, 28, 42, 39, 86, 87, 101, 102; 360/32; H04N 5/91, 5/445

(56) References Cited

U.S. PATENT DOCUMENTS 5,974,222 A * 10/1999 Yuen et al. .................... 386/83
6,742,183 B1 * 5/2004 Reynolds et al. .............. 725/32

FOREIGN PATENT DOCUMENTS

| FR | 2 770 956 A1 | 5/1999 |
| JP | 10-51752 A | 2/1998 |
| JP | 11-127411 | 5/1999 |
| WO | WO 98/26594 A1 | 6/1998 |
| WO | WO 99/11066 A1 | 3/1999 |
| WO | WO 99/29106 A1 | 6/1999 |
| WO | WO 00/35193 A1 | 6/2000 |

* cited by examiner

Primary Examiner—Robert Chevalier
(74) Attorney, Agent, or Firm—Sughrue Mion, PLLC

(57) ABSTRACT

A personal commercial bank system includes: a database system (1, 2) having data containing a broadcasting time, a broadcasting channel number, and a sponsor name of an advertisement program; and a video recording apparatus (7) having a video recording unit (5) which receives, as a reception signal, a broadcast signal containing a broadcast content and an advertisement content and which records the reception signal. The video recording unit has a communication unit (3) which communicates with the database system. The video recording unit receives, from the database system via the communication unit, the broadcasting time and the broadcasting channel number of the advertisement program to be recorded. Thereafter, the video recording unit records, in accordance with the broadcasting time and the channel number of the advertisement program to be recorded, the advertisement content corresponding to the advertisement program to be recorded.

23 Claims, 5 Drawing Sheets

PERSONAL COMMERCIAL BANK SYSTEM

BACKGROUND OF THE INVENTION

The present invention relates to a video recording/playback apparatus in which advertisement content is received and recorded (stored) while broadcast content or internet content is also received and in which the advertisement content can be played back when necessary.

In accordance with the development of satellite broadcasting and the like, many broadcasting channels are provided. A system has been desired which enables viewers to watch broadcast content at their convenience. In order to realize this, VCRs (video cassette recorders) and apparatuses with hard disk drives mounted therein have been developed as video recording apparatuses for recording broadcast content. In accordance with this development, apparatuses with a feature of skipping advertisement content (commercials) have been introduced (see Japanese Unexamined Patent Publication (JP-A) No. 11-127411). Particularly, in video recording apparatuses using hard disk drives, even though the advertisement content is recorded, the advertisement-content skipping feature has been considerably improved with the aid of high-speed playback and high-speed seeking features.

The introduction of and improvement in video recording apparatuses in which a large amount of broadcast content can be recorded and stored has enabled the advertisement content broadcast among the broadcast content to be skipped during playback, even though the advertisement content is recorded along with the broadcast content.

Under such conditions in which the advertisement-content skipping feature is available, sales promotion by means of broadcasting with simple advertisement content has lost its effectiveness.

SUMMARY OF THE INVENTION

Accordingly, it is an object of the present invention to provide a personal commercial (i.e. advertisement) bank system which functions as a new sales promotion tool for effectively presenting advertisement content to end users.

To this end, there is provided a personal commercial bank system comprising:

a database system which comprises data comprising a broadcasting time, a broadcasting channel number, and a sponsor name of an advertisement program; and a video recording apparatus which comprises a video recording unit for receiving, as a reception signal, a broadcast signal comprising a broadcast content and an advertisement content and for recording the reception signal;

the video recording unit comprising communication means for communicating with the database system;

the video recording unit receiving, from the database system via said communication means, the broadcasting time and the broadcasting channel number of the advertisement program to be recorded, the video recording unit recording, in accordance with the broadcasting time and the channel number of the advertisement program to be recorded, the advertisement content corresponding to the advertisement program to be recorded.

Further objects, features, and advantages of the present invention will be apparent from the following description of the embodiment with reference to the attached drawings.

DESCRIPTION OF THE PREFERRED EMBODIMENT

Figure 1:
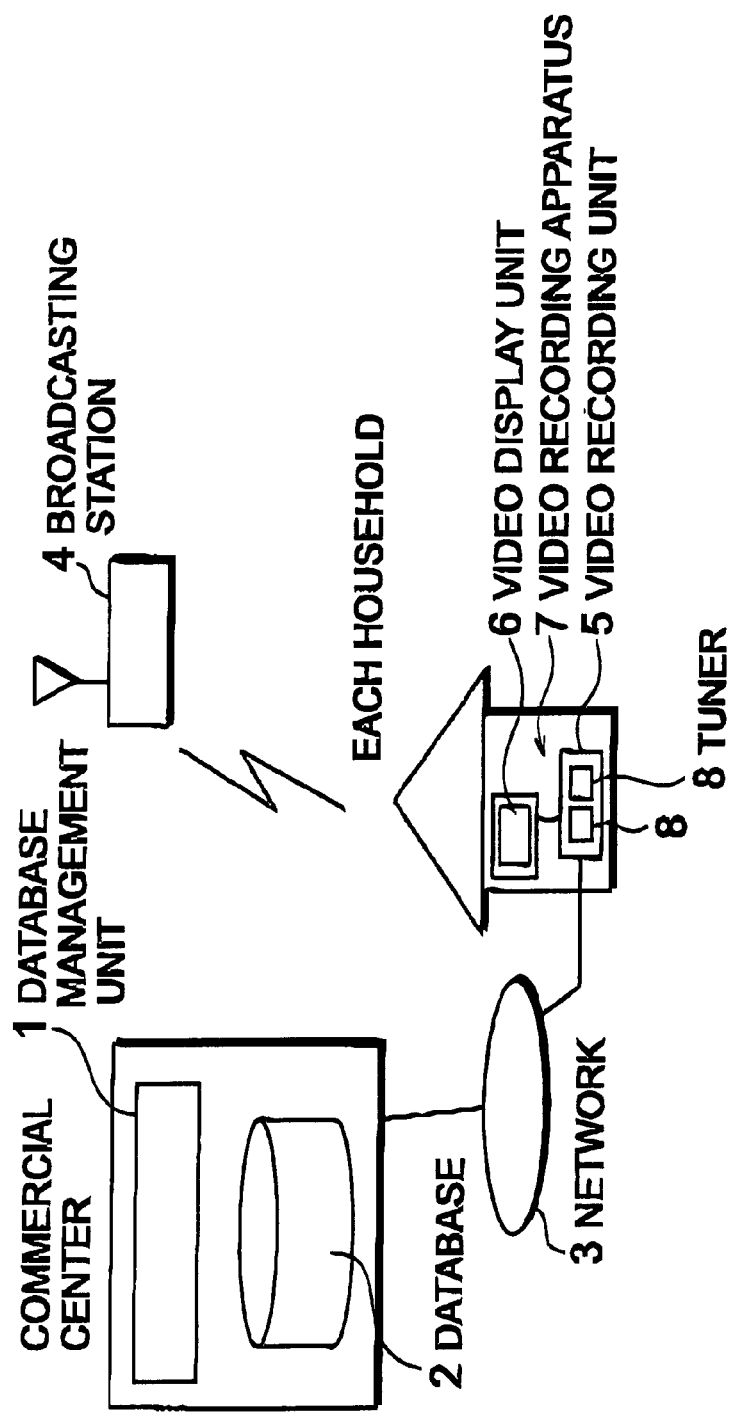
FIG. 1 is a block diagram of a personal commercial bank system according to the embodiment of the present invention.

FIG. 1 shows a block diagram of a personal commercial bank system according to the embodiment of the present invention.

Figure 2:
FIG. 2 is an illustration showing one example of advertisement information data stored in a database in a commercial data center in FIG. 1.

In FIG. 1, the personal commercial bank system includes a database system having a database management unit 1 and a database 2, and a video recording apparatus 7. As shown in FIG. 2, the database 2 includes the broadcasting times, the channel number, and the sponsor names of advertisement programs. The video recording apparatus 7 includes a video recording unit 5 for receiving, as a reception signal, a broadcast signal containing broadcast content and advertisement content and for recording the reception signal therein.

The video recording unit 5 includes a communication unit (a network 3) for communicating with the database system. The video recording unit 5 receives, from the database system via the network 3, the broadcasting time and the broadcasting channel number of the advertisement program to be recorded. The video recording unit 5 records, in accordance with the broadcasting time and the channel number of the advertisement program to be recorded, the advertisement content corresponding to advertisement program to be recorded.

Features of the present embodiment are listed as follows.

(1) The video recording apparatus 7 further includes a video display unit 6 for displaying, as an electronic program guide (later illustrated), a table including a broadcast program corresponding to the broadcast content of the broadcast signal. The video recording unit 5 not only records, in accordance with the broadcasting time and the channel number of the advertisement program to be recorded, the advertisement content corresponding to the advertisement program to be recorded but also causes the video display unit 6 to display, as a commercial channel along with the electronic program guide, the advertisement content corresponding to the advertisement program to be recorded.

(2). The video recording apparatus 7 further includes a video display unit 6 for displaying, as an electronic program guide, a table including a broadcast program corresponding to the broadcast content of the broadcast signal. The video-recording unit 5 receives, from the database system via the the network 3, not only the broadcasting time and the broadcasting channel number of the advertisement program to be recorded but also the sponsor name of the advertisement program to be recorded. The video recording unit 5 not only records, in accordance with the broadcasting time and the channel number of the advertisement program to be recorded, the advertisement content corresponding to the advertisement program to be recorded but also causes the video display unit 6 to display, along with the electronic program guide by an icon representative of a sponsor corresponding to the sponsor name of the advertisement program to be recorded, the advertisement content corresponding to the advertisement program to be recorded.

(3). The database system includes, as the data, not only the broadcasting time, the broadcasting channel number, and the sponsor name of the advertisement program but also a sponsor icon representative of a sponsor of the advertisement program. The video recording apparatus 7 further includes a video display unit 6 for displaying, as an electronic program guide, a table including a broadcast program corresponding to the broadcast content of the broadcast signal. The video recording unit 5 receives, from the database system via the network 3, not only the broadcasting time and the broadcasting channel number of the advertisement program to be recorded but also the sponsor icon representative of the sponsor of the advertisement program to be recorded. The video recording unit 5 not only records, in accordance with the broadcasting time and the channel number of the advertisement program to be recorded, the advertisement content corresponding to the advertisement program to be recorded but also causes the video display unit to display, along with the electronic program guide by the sponsor icon representative of the sponsor of the advertisement program to be recorded, the advertisement content corresponding to the advertisement program to be recorded.

(4) The database system includes, as the data, not only the broadcasting time, the broadcasting channel number, and the sponsor name of the advertisement program but also a product type of a product advertised by the advertisement program. The video recording apparatus 7 further includes a video display unit 6 for displaying, as an electronic program guide, a table including a broadcast program corresponding to the broadcast content of the broadcast signal. The video recording unit 5 receives, from the database system via the network 3, not only the broadcasting time and the broadcasting channel number of the advertisement program to be recorded but also the sponsor name of the advertisement program to be recorded and the product type of the product advertised by the advertisement program to be recorded. The video recording unit 5 not only records, in accordance with the broadcasting time and the channel number of the advertisement program to be recorded, the advertisement content corresponding to the advertisement program to be recorded but also causes the video display unit to display, along with the electronic program guide by an icon representative of a sponsor corresponding to the sponsor name of the advertisement program to be recorded and by another icon representative of the product type of the product advertised by the advertisement program to be recorded, the advertisement content corresponding to the advertisement program to be recorded.

(5). The database system includes, as the data, not only the broadcasting time, the broadcasting channel number, and the sponsor name of the advertisement program but also an advertising display period during which the advertisement program is displayed. The video recording apparatus 7 further includes a video display unit 6 for displaying, as an electronic program guide, a table including a broadcast program corresponding to the broadcast content of the broadcast signal. The video recording unit 5 receives, from the database system via the network 3, not only the broadcasting time and the broadcasting channel number of the advertisement program to be recorded but also the sponsor name of the advertisement program to be recorded and the advertising display period during which the advertisement program to be recorded is displayed. The video recording unit 5 not only records, in accordance with the broadcasting time and the channel number of the advertisement program to be recorded, the advertisement content corresponding to the advertisement program to be recorded but also causes the video display unit 6 to display, during the advertising display period along with the electronic program guide by an icon representative of a sponsor corresponding to the sponsor name of the advertisement program to be recorded, the advertisement content corresponding to the advertisement program to be recorded.

(6). The database system includes, as the data, not only the broadcasting time, the broadcasting channel number, and the sponsor name of the advertisement program but also a sponsor icon representative of a sponsor of the advertisement program and an advertising display period during which the advertisement program is displayed. The video recording apparatus 7 further includes a video display unit 6 for displaying, as an electronic program guide, a table including a broadcast program corresponding to the broadcast content of the broadcast signal. The video recording unit 5 receives, from the database system via the network 3, not only the broadcasting time and the broadcasting channel number of the advertisement program to be recorded but also the sponsor icon, representative of the sponsor of the advertisement program to be recorded and the advertising display period during which the advertisement program to be recorded is displayed. The video recording unit 5 not only records, in accordance with the broadcasting time and the channel number of the advertisement program to be recorded, the advertisement content corresponding to the advertisement program to be recorded but also causes the video display unit 6 to display, during the advertising display period along with the electronic program guide by the sponsor icon representative of the sponsor of the advertisement program to be recorded, the advertisement content corresponding to the advertisement program to be recorded.

(7) The video recording apparatus 7 further includes a video display unit 6 for displaying the broadcast signal as a watching program (or a program to be watched). The video recording unit 5 not only records, in accordance with the broadcasting time and the channel number of the advertisement program to be recorded, the advertisement content corresponding to the advertisement program to be recorded but also causes the video display unit 6 to display, as a commercial channel along with the watching program (or the program to be watched), the advertisement content corresponding to the advertisement program to be recorded.

(8) The video recording apparatus 7 further includes a video display unit 6 for displaying the broadcast signal as a watching program. The video recording unit 5 receives, from the database system via the network 3, not only the broadcasting time and the broadcasting channel number of the advertisement program to be recorded but also the sponsor name of the advertisement program to be recorded. The video recording unit 5 not only records, in accordance with the broadcasting time and the channel number of the advertisement program to be recorded, the advertisement content corresponding to the advertisement program to be recorded but also causes the video display unit 5 to display, along with the watching program by an icon representative of a sponsor corresponding to the sponsor name of the advertisement program to be recorded, the advertisement content corresponding to the advertisement program to be recorded.

(9) The database system includes, as the data, not only the broadcasting time, the broadcasting channel number, and the sponsor name of the advertisement program but also a sponsor icon representative of a sponsor of the advertisement program. The video recording apparatus 7 further includes a video display unit 6 for displaying the broadcast signal as a watching program. The video recording unit 5 receives, from the database system via the network 3, not only the broadcasting time and the broadcasting channel number of the advertisement program to be recorded but also the sponsor icon representative of the sponsor of the advertisement program to be recorded. The video recording unit 5 not only records, in accordance with the broadcasting time and the channel number of the advertisement program to be recorded, the advertisement content corresponding to the advertisement program to be recorded but also causes the video display unit 6 to display, along with the watching program by the sponsor icon representative of the sponsor of the advertisement program to be recorded, the advertisement content corresponding to the advertisement program to be recorded.

(10) The database system includes, as the data, not only the broadcasting time, the broadcasting channel number, and the sponsor name of the advertisement program but also a product type of a product advertised by the advertisement program. The video recording apparatus 7 further includes a video display unit 6 for displaying the broadcast signal as a watching program. The video recording unit 5 receives, from the database system via the network 3, not only the broadcasting time and the broadcasting channel number of the advertisement program to be recorded but also the sponsor name of the advertisement program to be recorded and the product type of the product advertised by the advertisement program to be recorded. The video recording unit 5 not only records, in accordance with the broadcasting time and the channel number of the advertisement program to be recorded, the advertisement content corresponding to the advertisement program to be recorded but also causes the video display unit 5 to display, along with the watching program by an icon representative of a sponsor corresponding to the sponsor name of the advertisement program to be recorded and by another icon representative of the product type of the product advertised by the advertisement program to be recorded, the advertisement content corresponding to the advertisement program to be recorded.

(11) The database system includes, as the data, not only the broadcasting time, the broadcasting channel number, and the sponsor name of the advertisement program but also an advertising display period during which the advertisement program is displayed. The video recording apparatus 7 further includes a video display unit 6 for displaying the broadcast signal as a watching program. The video recording unit 5 receives, from the database system via the network 3, not only the broadcasting time and the broadcasting channel number of the advertisement program to be recorded but also the sponsor name of the advertisement program to be recorded and the advertising display period during which the advertisement program to be recorded is displayed. The video recording unit 5 not only records, in accordance with the broadcasting time and the channel number of the advertisement program to be recorded, the advertisement content corresponding to the advertisement program to be recorded but also causes the video display unit 6 to display, during the advertising display period along with the watching program by an icon representative of a sponsor corresponding to the sponsor name of the advertisement program to be recorded, the advertisement content corresponding to the advertisement program to be recorded.

(12) The database system includes, as the data, not only the broadcasting time, the broadcasting channel number, and the sponsor name of the advertisement program but also a sponsor icon representative of a sponsor of the advertisement program and an advertising display period during which the advertisement program is displayed. The video recording apparatus 7 further includes a video display unit 6 for displaying the broadcast signal as a watching program.

The video recording unit 5 receives, from the database system via the network 3, not only the broadcasting time and the broadcasting channel number of the advertisement program to be recorded but also the sponsor icon representative of the sponsor of the advertisement program to be recorded and the advertising display period during which the advertisement program to be recorded is displayed. The video recording unit 5 not only records, in accordance with the broadcasting time and the channel number of the advertisement program to be recorded, the advertisement content corresponding to the advertisement program to be recorded but also causes the video display unit to display, during the advertising display period along with the watching program by the sponsor icon representative of the sponsor of the advertisement program to be recorded, the advertisement content corresponding to the advertisement program to be recorded.

(13) The video recording unit 5 includes a plurality of tuners 8 each of which is for receiving the broadcast signal as the reception signal.

(14) The video recording apparatus 7 has a hard disk drive as a storage device of the video recording unit 5, performs a self-diagnosis on the hard disk drive, and informs the database system of the error status of the hard disk drive.

(15) When the icon or the sponsor icon displayed on the video display unit 6 is clicked, the video recording unit 5 causes the video display unit 6 to display so that the advertisement content corresponding to the advertisement program to be recorded can be watched on a full screen.

(16) When the icon or the sponsor icon displayed on the video display unit 6 is clicked, the video recording unit 5 not only causes the video display unit 6 to display so that the advertisement content corresponding to the advertisement program to be recorded can be watched on a full screen but also transfers to the database system the advertisement program watched on a full screen and an identification number of the video recording apparatus 7 which records the advertisement program watched on a full screen.

Next, the personal commercial bank system shown in FIG. 1 is described in detail.

A commercial data center (shown in FIG. 1) makes a contract with an advertisement sponsor and then creates a database including the broadcasting times and the product types of the advertisement content of the sponsor. After that, the commercial data center sends the created database to the video recording apparatus 7 of an end user in which the advertisement content of the contracted sponsor are stored and are offered.

In this embodiment, the database system has data including the broadcasting times, the channel numbers, the sponsor names, the product types, the sponsor icon data, and the advertising display periods of advertisement programs broadcast along with broadcast programs. Among these data, the broadcasting time, the channel number, the sponsor name, the product type, and the sponsor icon data of an advertisement program to be record are downloaded in a push-type manner from the database system to the video recording apparatus 7 via the network 3. The advertising program is recorded based on the above data and the recorded advertisement content is displayed as the icons. Therefore, even if advertisement content along with broadcast programs is skipped, these icons can bring the presence of the advertisements to the notice of the end user. When a click on an advertisement icon is reported to the database system, detailed advertisement content can be sent to the end user. Thus, a new sales promotion tool with the above-described features is provided.

As shown in FIG. 1, the broadcasting station 4 performs analog broadcasting or digital broadcasting. The video recording apparatus 7 including the video recording unit 5 and the video display unit 6 at the household of the end user can receive and record broadcast content broadcast from the broadcasting station 4.

The video recording unit 5 and the video display unit 6 may be integrated or may be separated. When the video recording unit 5 and the video display unit 6 are separated, they are coupled with a video signal or a serial interface such as an IEEE 1394 interface. Regardless of whether the video recording unit 5 is recording, the video recording apparatus 7 allows broadcast content to be watched on the video display unit 6. In addition, the video recording apparatus 7 includes at least two tuners 8 in the video recording unit 5, whereby broadcast content different from that which the end user is currently watched can be recorded. The video recording apparatus 7 can reproduce the recorded content.

The advertisement sponsor produces the advertisement program through an advertisement agency. The advertisement program is distributed to each household by being embedded in the broadcast content broadcast from the broadcasting station 4. The video recording unit 5 records the broadcast content including the advertisement program.

The advertisement sponsor obtains the broadcasting times of the advertisement program which is to be broadcast from the broadcasting station 4. The commercial data center makes a contract with the advertisement sponsor and then causes the database management unit 1 to store the broadcasting times, the product types, and the channel numbers of the advertising program in the database 2 according to the broadcasting stations 4. The advertising display period based on the contract between the commercial data center and the advertisement sponsor and the sponsor icon which represents the advertisement sponsor are also stored in the database 2.

FIG. 2 shows one example of the data stored in the database 2 of the commercial data center.

The commercial database center makes a contract with the end user and then sends data stored in the database 2 to the video recording apparatus 7 (including the video recording unit 5 and the video display unit 6) via the network 3. The video recording apparatus 7 extracts the advertisement program out of the broadcast content from the broadcasting station 4 in accordance with the broadcasting times and the channel numbers of the advertisement program and records the extracted program. At this time, the video recording apparatus 7 records this advertisement program so as to be independent of broadcast programs which are recorded in accordance with a preference of the end user. When the channel number of the advertisement program to be recorded sent from the database 2 and the channel number of the program watched according to the preference of the end user are different, the advertisement program is recorded using an unused tuner from among a plurality of tuners 8.

The broadcasting station 4 broadcasts broadcast waves to end users by superposing the information table of broadcast programs (the electronic program guide) thereon. The video display unit 6 displays the electronic program guide and displays, as a dedicated commercial channel, sponsor icons or product type icons which represent the corresponding advertisement programs recorded based on the data sent from the commercial data center. Thus, the advertisement programs are shown to the end users.

Figure 3:
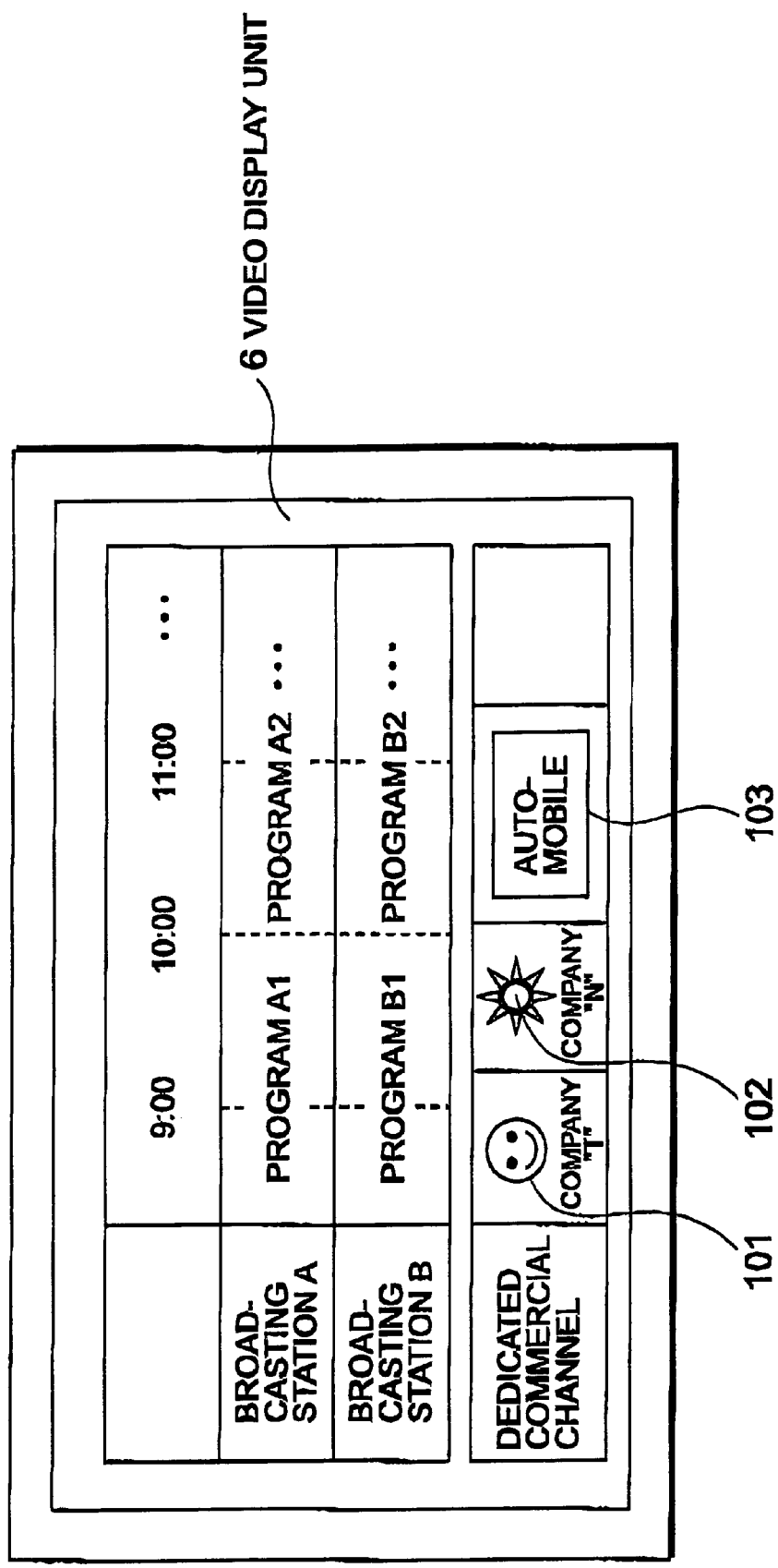
FIG. 3 is an illustration showing one example of the display of a video display unit of a video recording apparatus in FIG. 1 in which advertisement icons (here, sponsor icons and a product type icon) are displayed.

FIG. 3 shows a first example of the display on the video display unit 6 in which sponsor icons 101 and 102 and a product type icon 103 are used as the advertisement icons. In this example, the sponsor icons 101 and 102 and the product type icon 103 are displayed as the dedicated commercial channel along with the electronic program guide, The sponsor icons 101 and 102 that are displayed along with the electronic program guide in the dedicated commercial channel are shown during the corresponding advertising display periods which are sent from the commercial data center and which are based on the corresponding contracts between the advertisement sponsor and the commercial data center. The video recording apparatus 7 automatically erases a sponsor icon and the advertisement program represented by the sponsor icon after the advertising display period thereof passes. On the other hand, the product type icon 103 continues to be displayed on the video display unit 6 as long as any advertisement program whose advertising display period has not yet expired exists.

The user can watch advertisement programs exclusively by clicking on one of the sponsor icons 101 and 102 and the product type icon 103 displayed on the dedicated commercial channel in the electronic program guide. When the user clicks on any of the sponsor icons 101 and 102 and the product type icon 103, the video recording apparatus 7 sends user information to the commercial data center via the network 3. The user information includes information which is set when the contract between the commercial data center and the end user is made. The commercial data center offers the user information to the corresponding sponsor as marketing information. When the hard disk drive is used as the video recording unit 5, the video recording unit periodically executes a hard disk self-diagnosis program. For example, the hard disk self-diagnosis program is started when the video recording unit 5 is not in operation, such as at around midnight every night. The diagnosis program gathers data on the seek-speed and the error-occurrence rate of the hard disk drive and reports the gathered data to the commercial data center via the network 3. The commercial data center determines the current reliability of the hard disk drive such as the lifetime thereof and warns the end user of the possibility of difficulties in advance.

Figure 4:
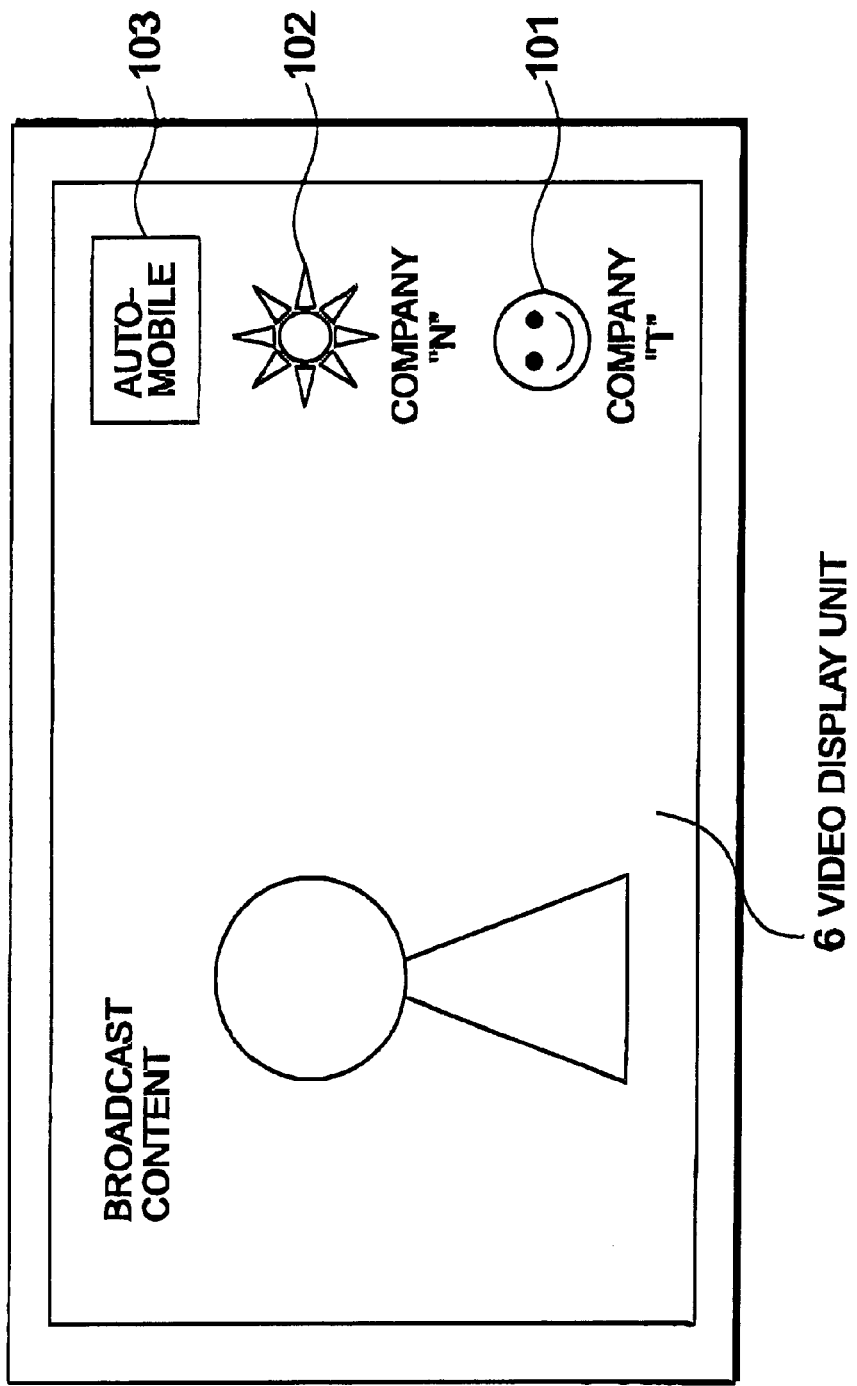
FIG. 4 is an illustration showing another example of the display of the video display unit of the video recording apparatus in FIG. 1 in which the advertisement icons are displayed.

FIG. 4 shows a second example of the display on the video display unit 6 in which the sponsor icons 101 and 102 and the product type icon 103 are used as the advertisement:icons. In this example, the sponsor icons 101 and 102 and the product type icon 103 are displayed while the end user is watched a broadcast program.

In FIG. 4, the video display unit 6 displays the broadcast content the end user currently watches as well as the sponsor icons 101 and 102 and the product type icon 103. The advertisement program, exclusively, can be watched on a full screen when the user clicks on any of the icons. In the same manner as in the first example, the click triggers the user information to be sent to the commercial data center.

Figure 5:
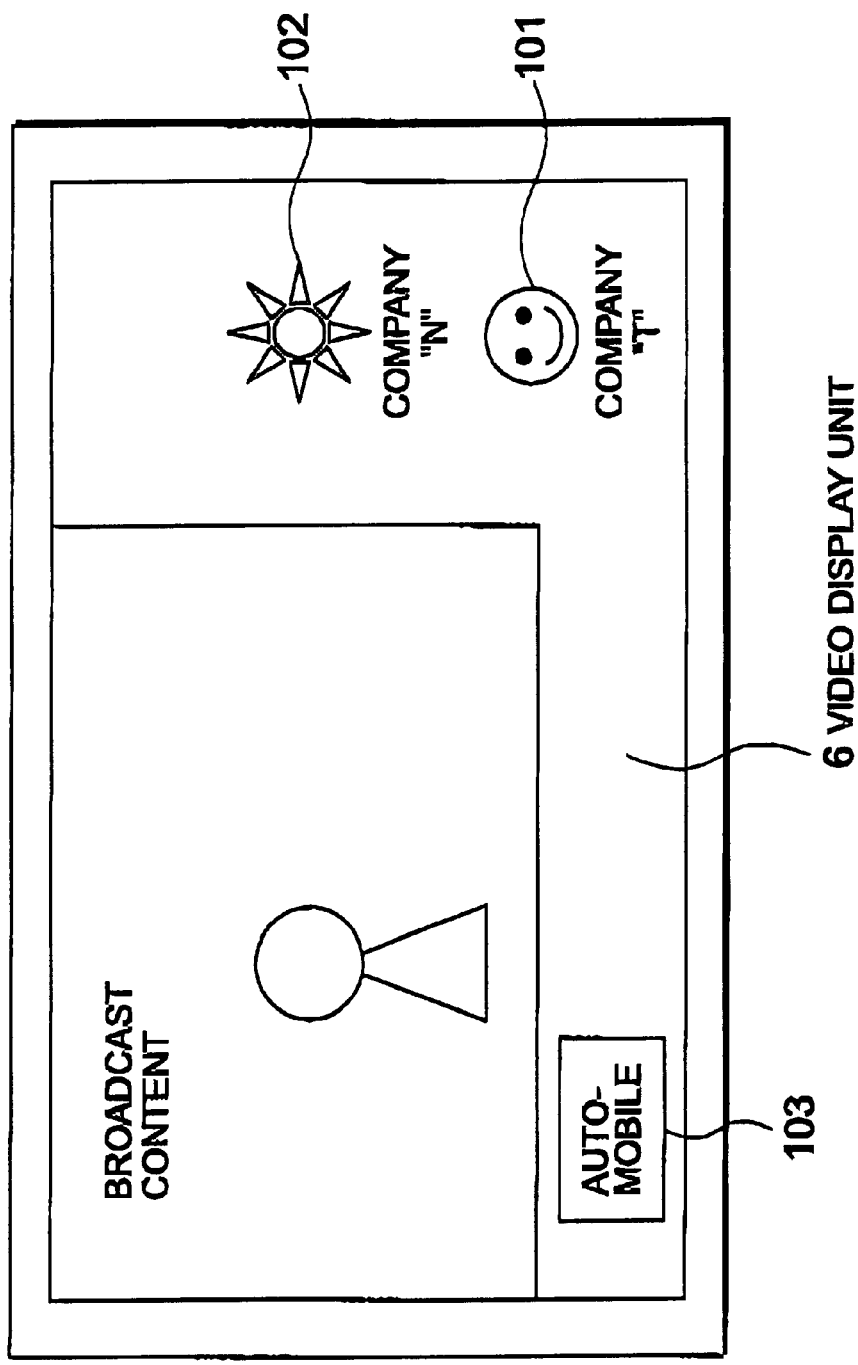
FIG. 5 is an illustration showing another example of the display of the video display unit of the video recording apparatus in FIG. 1 in which the advertisement icons are displayed.

FIG. 5 shows a third example of the display on the video display unit 6 in which the sponsor icons 101 and 102 and the product type icon 103 are used as the advertisement icons. In this example, the sponsor icons 101 and 102 and the product type icon 103 are displayed while the user is watched the broadcast program.

In FIG. 5, the video display unit 6 causes the sponsor icons 101 and 102 and the product type icon 103 to be displayed in an empty region obtained by shrinking the broadcast content currently being watched. The advertisement program, exclusively, can be watched on a full screen when the user clicks on any of the icons. In the same manner as in the first example, the click triggers the user information to be sent to the commercial data center.

When the video recording apparatus 7 is turned on or when the video display unit 6 is turned on, the screen shown in FIG. 5 is displayed. The sponsor icons 101 and 102 and the product type icon 103 continue to be displayed in the empty region as shown in FIG. 5 until a channel operation by the user causes the broadcast program to be displayed on a full screen. Thus, the advertisements are brought to the user's notice.

Alternatively, when the video recording apparatus 7 is turned on or when the video display unit 6 is turned on, the screen shown in FIG. 5 may be displayed for less than thirty seconds. Thus, the advertisements may be brought to the users notice.

When the video recording apparatus 7 is turned on or when the video display unit 6 is turned on, the sponsor icons 101 and 102 and the product type icon 103 are displayed in the empty region, as shown in FIG. 5. Particularly when the sponsor icon 101 or 102 includes prize-winning content, the icon may be highlighted or blinked. Thus, the advertisements may be brought to the users notice.

When the commercial data center can send news articles or product information to the video recording apparatus 7 via the network 3 based on the contract between the commercial data center and the user, and when the video recording apparatus 7 is turned on or when the video display unit 6 is turned on, instead of the screen shown in FIG. 5, the news articles or the product information sent from the commercial data center may be displayed.

In the above described embodiment, since sponsors can obtain the broadcasting times of their advertisement content which is broadcast along with the broadcast content, the commercial data center creates a database in which this information combined with information such as channel numbers and product types are stored. This combined information is sent via the network 3 to the video recording apparatus 7.

The advertisement content based on the contract between the commercial data center and the sponsor is recorded using the video recording apparatus 7 and is offered to the user. Furthermore, the commercial data center gathers information on the users who watch this advertisement content and offers the user information to the corresponding advertisement sponsor as marketing information. Therefore, a new sales promotion tool can be offered.

What is claimed is:

1. A personal commercial bank system comprising:
   a database system (1, 2) which comprises data comprising a broadcasting time, a broadcasting channel number, and a sponsor name of an advertisement program; and
   a video recording apparatus (7) which comprises a video recording unit (5) for receiving, as a reception signal, a broadcast signal comprising a broadcast content and an advertisement content and for recording said reception signal;
   said video recording unit comprising communication means (3) for communicating with said database system;
   said video recording unit receiving, from said database system via said communication means, the broadcasting time and the broadcasting channel number of the advertisement program to be recorded, said video recording unit recording, in accordance with the broadcasting time and the channel number of the advertisement program to be recorded, the advertisement content corresponding to the advertisement program to be recorded.

2. A personal commercial bank system as claimed in claim 1, said video recording apparatus further comprising a video display unit (6) for displaying, as an electronic program guide, a table including a broadcast program corresponding to the broadcast content of said broadcast signal, wherein:
   said video recording unit not only records, in accordance with the broadcasting time and the channel number of the advertisement program to be recorded, the advertisement content corresponding to the advertisement program to be recorded but also causes said video display unit to display, as a commercial channel along with said electronic program guide, the advertisement content corresponding to the advertisement program to be recorded.

3. A personal commercial bank system as claimed in claim 1, said video recording apparatus further comprising a video display unit (6) for displaying, as an electronic program guide, a table including a broadcast program corresponding to the broadcast content of said broadcast signal, wherein:
   said video recording unit receives, from said database system via said communication means, not only the broadcasting time and the broadcasting channel number of the advertisement program to be recorded but also the sponsor name of the advertisement program to be recorded, said video recording unit not only recording, in accordance with the broadcasting time and the channel number of the advertisement program to be recorded, the advertisement content corresponding to the advertisement program to be recorded but also causing said video display unit to display, along with said electronic program guide by an icon representative of a sponsor corresponding to the sponsor name of the advertisement program to be recorded, the advertisement content corresponding to the advertisement program to be recorded.

4. A personal commercial bank system as claimed in claim 1, said database system comprising, as said data, not only the broadcasting time, the broadcasting channel number, and the sponsor name of the advertisement pro gram but also a sponsor icon representative of a sponsor of the advertisement program, said video recording apparatus further comprising a video display unit (6) for displaying, as an electronic program guide, a table including a broadcast program corresponding to the broadcast content of said broadcast signal, wherein:
   said video recording unit receives, from said database system via said communication means, not only the broadcasting time and the broadcasting channel number of the advertisement program to be recorded but also the sponsor icon representative of the sponsor of the advertisement program to be recorded, said video recording unit not only recording, in accordance with the broadcasting time and the channel number of the advertisement program to be recorded, the advertisement content corresponding to the advertisement program to be recorded but also causing said video display unit to display, along with said electronic program guide by the sponsor icon representative of the sponsor of the advertisement program to be recorded, the advertisement content corresponding to the advertisement program to be recorded.

5. A personal commercial bank system as claimed in claim 1, said database system comprising, as said data, not only the broadcasting time, the broadcasting channel number, and the sponsor name of the advertisement program but also a product type of a product advertised by the advertisement program, said video recording apparatus further comprising a video display unit (6) for displaying, as an electronic program guide, a table including a broadcast program corresponding to the broadcast content of said broadcast signal, wherein:
   said video recording unit receives, from said database system via said communication means, not only the broadcasting time and the broadcasting channel number of the advertisement program to be recorded but also the sponsor name of the advertisement program to be recorded and the product type of the product advertised by the advertisement program to be recorded, said video recording unit not only recording, in accordance with the broadcasting time and the channel number of the advertisement program to be recorded, the advertisement content corresponding to the advertisement program to be recorded but also causing said video display unit to display, along with said electronic program guide by an icon representative of a sponsor corresponding to the sponsor name of the advertisement program to be recorded and by another icon representative of the product type of the product advertised by the advertisement program to be recorded, the advertisement content corresponding to the advertisement program to be recorded.

6. A personal commercial bank system as claimed in claim 1, said database system comprising, as said data, not only the broadcasting time, the broadcasting channel number, and the sponsor name of the advertisement program but also an advertising display period during which the advertisement program is displayed, said video recording apparatus further comprising a video display unit (6) for displaying, as an electronic program guide, a table including a broadcast program corresponding to the broadcast content of said broadcast signal, wherein:

said video recording unit receives, from said database system via said communication means, not only the broadcasting time and the broadcasting channel number of the advertisement program to be recorded but also the sponsor name of the advertisement program to be recorded and the advertising display period during which the advertisement program to be recorded is displayed, said video recording unit not only recording, in accordance with the broadcasting time and the channel number of the advertisement program to be recorded, the advertisement content corresponding to the advertisement program to be recorded but also causing said video display unit to display, during said advertising display period along with said electronic program guide by an icon representative of a sponsor corresponding to the sponsor name of the advertisement program to be recorded, the advertisement content corresponding to the advertisement program to be recorded.

7. A personal commercial bank system as claimed in claim 1, said database system comprising, as said data, not only the broadcasting time, the broadcasting channel number, and the sponsor name of the advertisement program but also a sponsor icon representative of a sponsor of the advertisement program and an advertising display period during which the advertisement program is displayed, said video recording apparatus further comprising a video display unit (6) for displaying, as an electronic program guide, a table including a broadcast program corresponding to the broadcast content of said broadcast signal, wherein:

said video recording unit receives, from said database system via said communication means, not only the broadcasting time and the broadcasting channel number of the advertisement program to be recorded but also the sponsor icon representative of the sponsor of the advertisement program to be recorded and the advertising display period during which the advertisement program to be recorded is displayed, said video recording unit not only recording, in accordance with the broadcasting time and the channel number of the advertisement program to be recorded, the advertisement content corresponding to the advertisement, program to be recorded but also causing said video display unit to display, during said advertising display period along with said electronic program guide by the sponsor icon representative of the sponsor of the advertisement program to be recorded, the advertisement content corresponding to the advertisement program to be recorded.

8. A personal commercial bank system as claimed in claim 1, said video recording apparatus further comprising a video display unit (6) for displaying said broadcast signal as a watching program, wherein:

said video recording unit not only records, in accordance with the broadcasting time and the channel number of the advertisement program to be recorded, the advertisement content corresponding to the advertisement program to be recorded but also causes said video display unit to display, as a commercial channel along with said watching program, the advertisement content corresponding to the advertisement program to be recorded.

9. A personal commercial bank system as claimed in claim 1, said video recording apparatus further comprising a video display unit (6) for displaying said broadcast signal as a watching program, wherein:

said video recording unit receives, from said database system via said communication means, not only the broadcasting time and the broadcasting channel number of the advertisement program to be recorded but also the sponsor name of the advertisement program to be recorded, said video recording unit not only recording, in accordance with the broadcasting time and the channel number of the advertisement program to be recorded, the advertisement content corresponding to the advertisement program to be recorded but also causing said video display unit to display, along with said watching program by an icon representative of a sponsor corresponding to the sponsor name of the advertisement program to be recorded, the advertisement content corresponding to the advertisement program to be recorded.

10. A personal commercial bank system as claimed in claim 1, said database system comprising, as said data, not only the broadcasting time, the broadcasting channel number, and the sponsor name of the advertisement program but also a sponsor icon representative of a sponsor of the advertisement program, said video recording apparatus further comprising a video display unit (6) for displaying said broadcast signal as a watching program, wherein:

said video recording unit receives, from said database system via said communication means, not only the broadcasting time and the broadcasting channel number of the advertisement program to be recorded but also the sponsor icon representative of the sponsor of the advertisement program to be recorded, said video recording unit not only recording, in accordance with the broadcasting time and the channel number of the advertisement program to be recorded, the advertisement content corresponding to the advertisement program to be recorded but also causing said video display unit to display, along with said watching program by the sponsor (con representative of the sponsor of the advertisement program to be recorded, the advertisement content corresponding to the advertisement program to be recorded.

11. A personal commercial bank system as claimed in claim 1, said database system comprising, as said data, not only the broadcasting time, the broadcasting channel number, and the sponsor name of the advertisement program but also a product type of a product advertised by the advertisement program, said video recording apparatus further comprising a video display unit (6) for displaying said broadcast signal as a watching program, wherein:

said video recording unit receives, from said database system via said communication means, not only the broadcasting time and the broadcasting channel number of the advertisement program to be recorded but also the sponsor name of the advertisement program to be recorded and the product type of the product advertised by the advertisement program to be recorded, said video recording unit not only recording, in accordance with the broadcasting time and the channel number of the advertisement program to be recorded, the advertisement content corresponding to the advertisement program to be recorded but also causing said video display unit to display, along with said watching program by an icon representative of a sponsor corresponding to the sponsor name of the advertisement program to be recorded and by another icon representative of the product type of the product advertised by the advertisement program to be recorded, the advertisement content corresponding to the advertisement program to be recorded.

12. A personal commercial bank system as claimed in claim 1, said database system comprising, as said data, not only the broadcasting time, the broadcasting channel number, and the sponsor name of the advertisement program but also an advertising display period during which the advertisement program is displayed, said video recording apparatus further comprising a video display unit (6) for displaying said broadcast signal as a watching program, wherein:

said video recording unit receives, from said database system via said communication means, not only the broadcasting time and the broadcasting channel number of the advertisement program to be recorded but also the sponsor name of the advertisement program to be recorded and the advertising display period during which the advertisement program to be recorded is displayed, said video recording unit not only recording, in accordance with the broadcasting time and the channel number of the advertisement program to be recorded, the advertisement content corresponding to the advertisement program to be recorded but also causing said video display unit to display, during said advertising display period along with said watching program by an icon representative of a sponsor corresponding to the sponsor name of the advertisement program to be recorded, the advertisement content corresponding to the advertisement program to be recorded.

13. A personal commercial bank system as claimed in claim 1, said database system comprising, as said data, not only the broadcasting time, the broadcasting channel number, and the sponsor name of the advertisement program but also a sponsor icon representative of a sponsor of the advertisement program and an advertising display period during which the advertisement program is displayed, said video recording apparatus further comprising a video display unit (6) for displaying said broadcast signal as a watching program, wherein:

said video recording unit receives, from said database system via said communication means, not only the broadcasting time and the broadcasting channel number of the advertisement program to be recorded but also the sponsor icon representative of the sponsor of the advertisement program to be recorded and the advertising display period during which the advertisement program to be recorded is displayed, said video recording unit not only recording, in accordance with the broadcasting time and the channel number of the advertisement program to be recorded, the advertisement content corresponding to the advertisement program to be recorded but also causing said video display unit to display, during said advertising display period along with said watching program by the sponsor icon representative of the sponsor of the advertisement program to be recorded, the advertisement content corresponding to the advertisement program to be recorded.

14. A personal commercial bank system as claimed in claim 1, wherein said video recording unit comprises a plurality of tuners (8) each of which is for receiving said broadcast signal as said reception signal.

15. A personal commercial bank system as claimed in claim 1, wherein said video recording apparatus comprises a hard disk drive as a storage device of said video recording unit, performs a self-diagnosis on said hard disk drive, and informs said database system of the error status of said hard disk drive.

16. A personal commercial bank system as claimed in claim 3, wherein:

when the icon displayed on said video display unit is clicked, said video recording unit causes said video display unit to display so that the advertisement content corresponding to the advertisement program to be recorded can be watched on a full screen.

17. A personal commercial bank system as claimed in claim 16, wherein:

when the icon displayed on said video display unit is clicked, said video recording unit not only causes said video display unit to display so that the advertisement content corresponding to the advertisement program to be recorded can be watched on a full screen but also transfers to said database system the advertisement program watched on a full screen and an identification number of said video recording apparatus recording the advertisement program watched on a full screen.

18. A personal commercial bank system as claimed in claim 4, wherein:

when the sponsor icon displayed on said video display unit is clicked, said video recording unit causes said video display unit to display so that the advertisement content corresponding to the advertisement program to be recorded can be watched on a full screen.

19. A personal commercial bank system as claimed in claim 18, wherein:

when the sponsor icon displayed on said video display unit is clicked, said video recording unit not only causes said video display unit to display so that the advertisement content corresponding to the advertisement program to be recorded can be watched on a full screen but also transfers to said database system the advertisement program watched on a full screen and an identification number of said video recording apparatus recording the advertisement program watched on a full screen.

20. A personal commercial bank system as claimed in claim 9, wherein:

when the icon displayed on said video display unit is clicked, said video recording unit causes said video display unit to display so that the advertisement content corresponding to the advertisement program to be recorded can be watched on a full screen.

21. A personal commercial bank system as claimed in claim 20, wherein:

when the icon displayed on said video display unit is clicked, said video recording unit not only causes said video display unit to display so that the advertisement content corresponding to the advertisement program to be recorded can be watched on a full screen but also transfers to said database system the advertisement program watched on a full screen and an identification number of said video recording apparatus recording the advertisement program watched on a full screen.

22. A personal commercial bank system as claimed in claim 10, wherein:

when the sponsor icon displayed on said video display unit is clicked, said video recording unit causes said video display unit to display so that the advertisement content corresponding to the advertisement program to be recorded can be watched on a full screen.

23. A personal commercial bank system as claimed in claim 22, wherein:

when the sponsor icon displayed on said video display unit is clicked, said video recording unit not only causes said video display unit to display so that the advertisement content corresponding to the advertisement program to be recorded can be watched on a full screen but also transfers to said database system the advertisement program watched on a full screen and an identification number of said video recording apparatus recording the advertisement program watched on a full screen.

* * * * *